Sept. 23, 1969 C. E. IVES 3,468,493

TAPE TAB

Filed Sept. 27, 1967 2 Sheets-Sheet 1

INVENTOR.
Clifford E. Ives
BY Harbaugh & Thomas
Attys.

Sept. 23, 1969 C. E. IVES 3,468,493

TAPE TAB

Filed Sept. 27, 1967 2 Sheets-Sheet 2

INVENTOR.
Clifford E. Ives
BY
Harbaugh & Thomas
Attys.

United States Patent Office 3,468,493

Patented Sept. 23, 1969

3,468,493

TAPE TAB

Clifford E. Ives, 1630 Washington Ave., Wilmette, Ill. 60091

Filed Sept. 27, 1967, Ser. No. 670,952
Int. Cl. B65h *75/28*
U.S. Cl. 242—74 11 Claims

ABSTRACT OF THE DISCLOSURE

A tab attached adjacent each end of a magnetic tape and having flexible wing portions extending laterally beyond the edges of the tape preferably provided with pressure sensitive adhesive on the side facing the hub of the reel to flex radially outwardly with the adhesive contacting the facing sides of the reel flanges to hold the tape end portion against radial movement.

The invention is in the field of attachments, hereinafter referred to as tabs, secured to both ends of a reeled tape to provide the dual purposes of causing the tape to be self-locking on tape reels when starting the winding thereof, and secondly to prevent the tape from unwinding from a full reel of tape during the handling thereof yet will release quite easily without breaking the tape when pulled free.

As background, a large volume of tape recordings are being made for blind students in their search for education and the need is great to assist them in every way possible to facilitate the threading and removal of their tapes in their tape recorders and also to prevent the unwinding of full reels of tape when being handled or stored. Starting of the tape in the take-up reel is particularly irksome even for a sighted person and breaking the tape on a rewind is particularly objectionable. My invention makes this operation quite simple and easy.

At the present time as part of the existing problem the space between the flanges of a variety of reels varies from .303 inch to .380 inch. Since the usual width of the tape is .250 inch, the clearance between the tape and the flange varies as much as .077 inch and difficulty of providing a device surmounting this wide variation is great. For example, in order to prevent inadvertent unwinding from full reels of tape, the blind student is provided with an elastic band stretched around a full reel of tape. These bands are not only expensive but, being under tension, are often ineffective because many reels have such a wide space between the flanges that the band will slip off of the tape and contract into the space between the tape and the flange and fail its function. Retrieval is an aggravation.

Attempts have been made heretofore to provide devices at the ends of flexible narrow tapes to aid in the starting of the winding and at the same time to prevent these materials from unwinding when fully wound, but due to the extreme variations in the clearance between the flanges of the reels, and the speed of a fast transfer, either forward or backward, in a wide variety of tape recorders; the difficulty of applying these devices; and, because of their expense and initial effectiveness, these devices have not met with ready acceptance. Moreover, many tapes, made of acetate and the like, are very fragile and easily broken, so that when a self-performing device is attached to this type of tape, it must be able to pass at high speed around sharp corners and through narrow restricted paths without injury to the tape or to itself. For the above reasons the shape of the tab and the material from which it is made must be very carefully considered.

Accordingly, it is among objects of the invention to provide a tab to be placed at or preferably near the end of magnetic tape that will hold the tape on an empty reel regardless of the width of the space between the flanges of the reel on which the tape is to be wound; will enable the tab and tape to be easily received between the flanges of an empty reel on a tape recorder yet when the reel starts turning the tab will move to the hub and immediately self-lock at the hub of said reel and begin to wind the tape on said reel; will hold the tape on a full reel or a partly filled reel to prevent the tape from unwinding from said reel during the handling of the same; and at high speed rewind will not cause breakage of delicate or fragile tape in the vicinity of said tap.

A further object of the invention is to provide a self-locking self-releasing tab that will accommodate itself to any design of tape recorder of any type of reel. Another object is to provide a self-locking tab for application on magnetic tapes that may be mass-produced very rapidly, inexpensively and efficiently, and packaged for easy application and which can be either hand applied by an amature for his own use or be mechanically applied en masse, both rapidly and efficiently, in a tape manufacturer's plant.

Another object is to provide a self-locking tab having pressure sensitive adhesive on one side thereof to facilitate its attachment to and removal from magnetic tape.

Other objects and features of my invention will become apparent from a consideration of the following detailed description taken with the accompanying drawings wherein.

Figures 1, 2, 3, 4:
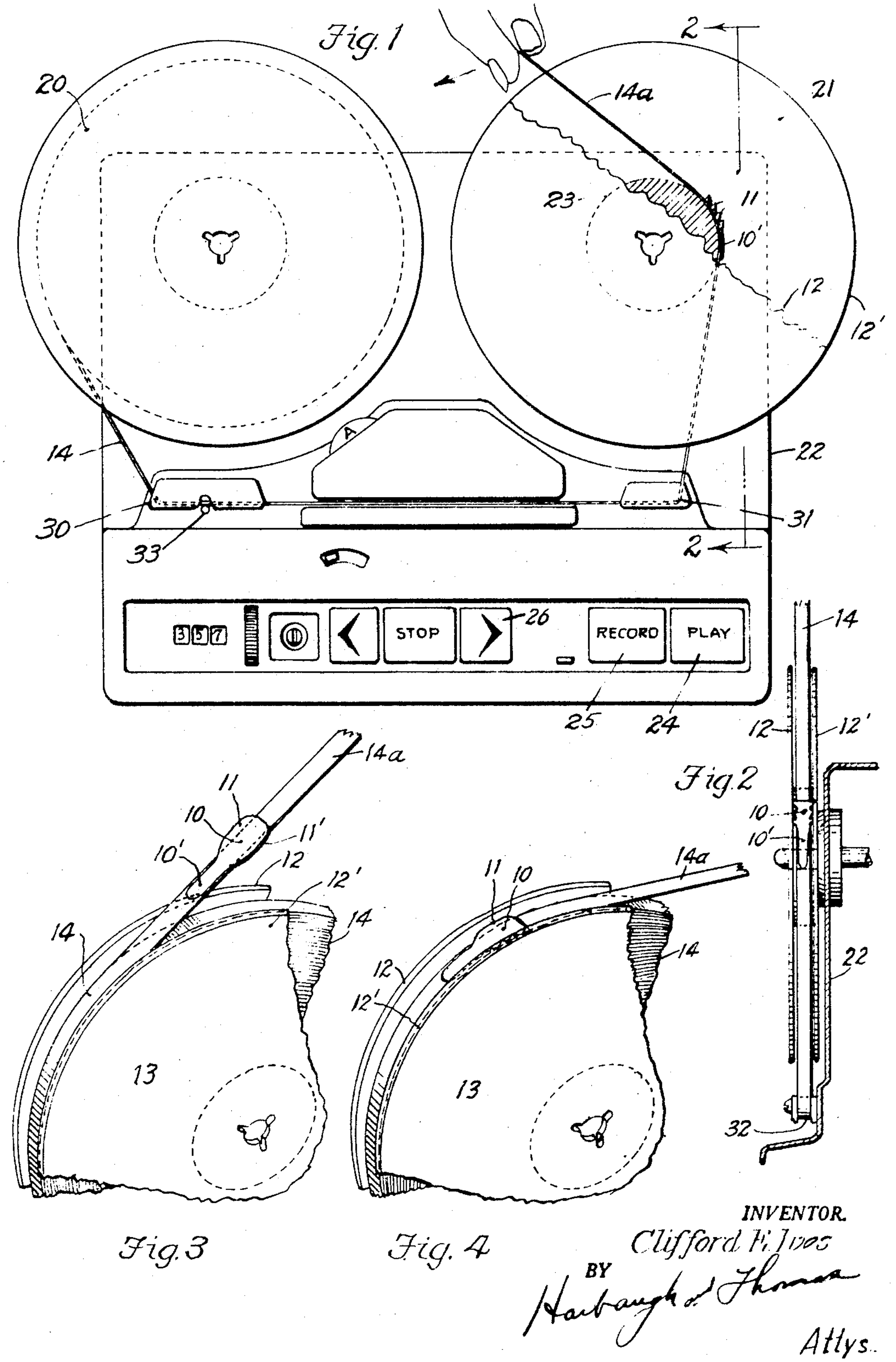
FIG. 1 is a plan view of a typical tape recorder with a full reel of tape and an empty reel placed thereon in the usual well known manner.
FIG. 2 is a cross-section taken on the line 2—2 of FIG. 1.
FIG. 3 is a segment of a typical full reel of tape with a tab placed near the loose end of the tape.
FIG. 4 is similar to FIG. 3 except that the tab has been locked between the flanges of the reel, thus preventing the unwinding of the tape.

Referring now to FIGS 3 and 4, the tab 10 is preferably made of thin, tough, flexible sheet material, preferably of woven stock, which is coated on one side with a film of pressure sensitive adhesive for ultimate adhesion over a large area to the shiny uncoated side of the magnetic tape 14. The overall distance between the sides 11 and 11' is greater than the maximum distance between the flanges 12 and 12' of the reel 13, so that the tab wedges itself between the flanges 12 and 12' thereby locking firmly therebetween with the assistance of the adhesive on the wings engaging the flanges and preventing the unwinding of the tape 14 from the reel 13. Preferably the tab is spaced a distance from the end of the tape at least equal to the radius of the reel so that the tab wings may be brought into contact with the reel flanges by pulling it into place as shown in FIG. 1 with movement by hand in the direction shown by the arrow.

Referring to FIG. 1, a full reel 20 and an empty take-up reel 21 are placed in the usual manner on any common type tape recorder 22. The lead tab 10 which previously had been pulled into place to prevent the tape 14 from unwinding from the full reel 20 is now released therefrom by pulling outwardly on the projecting end of the tape 14*a*. Thereupon the tape 14 is threaded through the recorder 22 in the usual manner and then tab 10 placed between the flanges of the take-up reel to be drawn inwardly towards the hub 23 with the wings wedging between the flanges 12 and 12' of the take-up reel 21 when the take-up reel begins to turn.

Pressure on the "PLAY" button 24, the "RECORD" button 25, or upon the "FAST FORWARD" button 26 will cause both reels 20 and 21 to start turning in a counterclockwise direction. Since the tab 10 is wedging between the flanges 12 and 12' it will be drawn in and against the hub 23 of the take-up reel 21, and the tape will begin to wind on take-up reel 21 and to unwind from reel 20.

Figure 5:
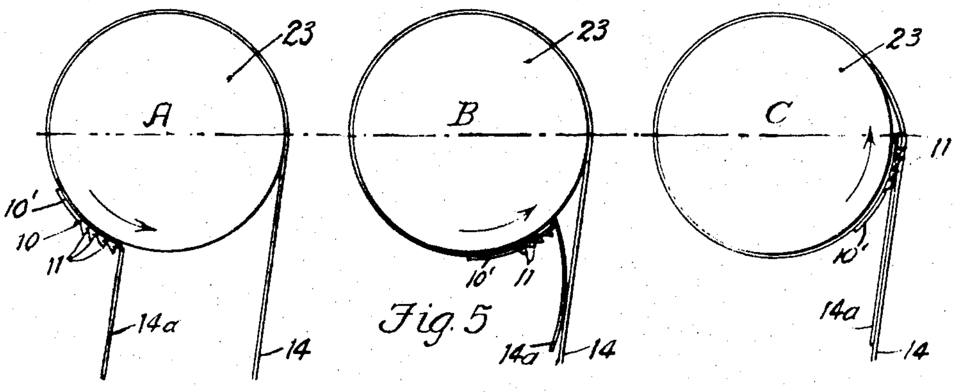
FIGS. 5A, 5B and 5C illustrate three random positions of the hub of the reel as the tape begins to wind therearound.

Now, referring to the sequence FIGS. 5A, 5B and 5C, it will be observed that as the hub 23 begins turning, the tab 10 and the projecting end of the tape 14*a* follows the hub 23 around progressively until the projecting end of the tape 14*a* is finally folded back over upon itself by the next turn of incoming tape 14 as illustrated in FIG. 5C.

An alternate way of applying the tab mounted on the tape is to grip the tape on both sides and either pull or push the tab into place before the reel begins to turn. This obviates problems involved with excess tape remaining between the take-up reel and capstan after threading.

Referring again to FIG. 1 many tape recorders have sharp corners 30 and 31 around which the tape 14 with its tab 10 must pass. Some tape recorders have narrow channels 32 (FIG. 2) through which the tape 14 with its tab 10 must pass, sometimes at exceedingly high speeds. Many tape recorders are equipped with a stop switch 33 (FIG. 1) which makes contact by the presence of the tape 14, but when the tape is absent the stop switch 33 breaks a circuit and stops the recorder 22. This stop switch 33 acts as a further hazard to the high speed passage of anything attached to the tape 14. Because of sharp corners, narrow channels and other impediments in the path of self-locking tabs, the tabs embodying the invention are shaped and arranged to pass successfully around sharp corners at high speed. It is made preferably of flexible woven ribbon material and has a leader portion 10' preferably slightly narrower than the tape itself which flexes readily with the tape and is rounded off at the end so that initial forces encountered will not be concentrated at a point on fragile tape. The leader portion 10' must be long enough to pass around a sharp corner before the body 10 of the tab reaches that corner. This leader reinforces the fragile tape and protects it from injury.

In order to meet and pass obstructions and impediments at high speeds the serrations 11 and 11' shown in FIGS. 6B, 6C, 6D and 6E preferably slant away from the direction of high speed in order to forestall fouling in narrow channels and the like. Other materials may be used if they are very flexible and tough to withstand the ripping action of passing obstructions at high speed. Referring now to FIGS. 7A, 7B and 8 and their production for easy packaging and handling it is to be noted that the tabs lend themselves to an exceedingly high rate of production. A large roll of wide tab material 37, having first been coated with a thin film of pressure sensitive coating 36, and a roll of backing paper 35 of equal width are unwound together, pressed together continuously and become as one sheet temporarily. This resulting laminate is then fed through a continuous machine which prints and die cuts the tabs at an exceedingly high rate of production. The cutter cuts only through the tab material but does not cut through the backing paper. The unusable waste portion is stripped off, leaving only the tabs therefrom. After this process is completed, part of the production may be cut into sheets 38, as in FIG. 8 for amateur use and part may be slit into narrow strips 40 as in FIGS. 7A and 7B and rolled into large diameter rolls for machine application in a manufacturing plant.

Figure 6:
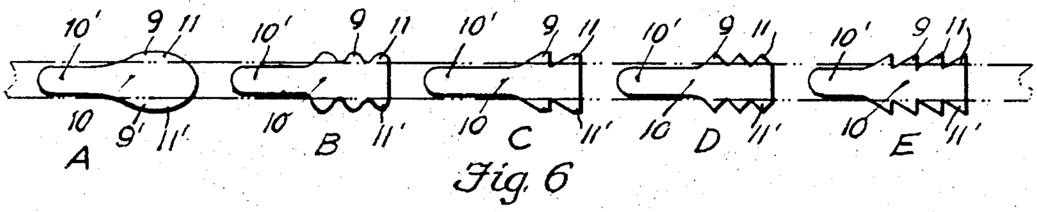
FIGS. 6A, 6B, 6C, 6D and 6E illustrates several embodiments of my invention. The preferred embodiment is the one designated by the letter A.

It will be observed that the wings 9 shown in FIG. 6 may be single as shown in 6A or multiple as shown in 6B, 6C, 6D and 6E but do not vary in relative over-all length for each tab or the adhesive coated area exposed beyond the edges of the tape. Preferably, where there are two or more, the space between them extends to the edge of the tape so that if a difference in relative hub diameters is known, the plural winged tabs can bend around a smaller size reel hub and still provide wedged adhesive contact with the flanges of the reel at the smallest diameter, the plural wings forming out in the plane of the flanges as they are drawn into place. If there are going to be plural wings it is preferred to standardize on the shape shown in FIG. 6E and FIG. 7B.

Figure 7:
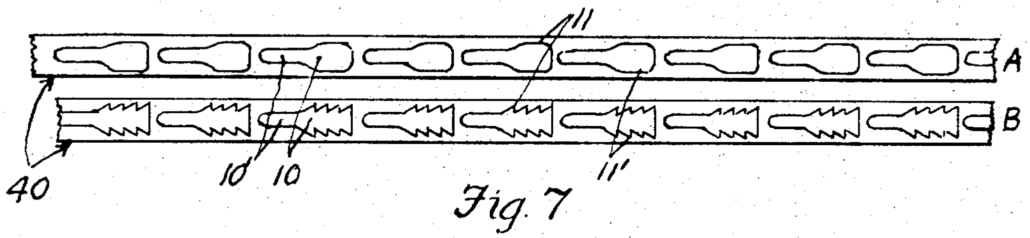
FIGS. 7A and 7B illustrate portions of continuous strips of backing paper upon each of which are mounted a continuous row of tabs for easy automatic removal therefrom.
Figure 8:
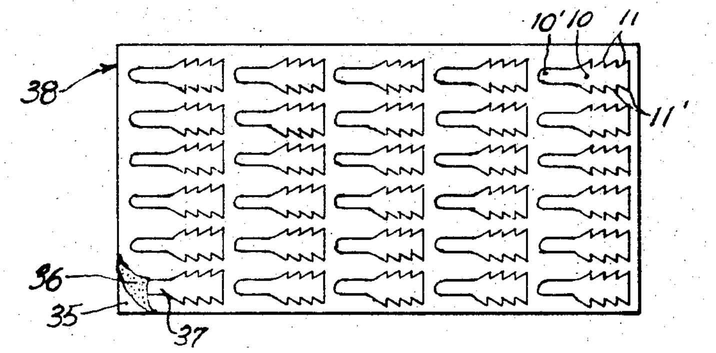
FIG. 8 illustrates a sheet of backing paper upon which are mounted a number of tabs for easy manual removal therefrom.

To free the tabs from the supporting strip 40 in FIG. 7 for application to tape, the strip can be drawn progressively lengthwise over a sharp corner. The tab progressively separates and tends to move in a straight direction so that it be freed to be applied to tape. This ability to separate under these conditions is a pragmatic test for an acceptable adhesive.

It will be appreciated that tabs embodying the invention may be used on other tapes under similar conditions and some modification can be made within the spirit of the invention. The word "tab" as employed herein contemplates at its wing portions 11 the approximate proportional shape, size and length with respect to magnetic tape as that shown in FIG. 6 of the drawing to bend around a small size tape reel hub and marginally still provide wedged contact with the flanges while remaining in their flexed position.

What is claimed is:

1. In combination, a flexible recording tape, a flexible tab attached adjacent the end of recording tape having a coated side, flexible wing means projecting beyond each edge of said tape to flex at right angles thereto away from said coated side.

2. The combination called for in claim 1 in which said wing means projecting beyond the edges of said tape includes a leader portion engaging the tape and extending away from said end of the tape.

3. The combination called for in claim 1 in which said wing means comprises saw tooth shaped serrations projecting beyond the edges of said tape.

4. The combination called for in claim 1 in which said wing means includes a pressure sensitive adhesive means disposed thereon upon the same side thereof as the coated side of the tape.

5. In combination a reel having a hub and spaced flanges, a flexible magnetic recording tape having a coated working side facing towards the hub of the reel and a back side, a flexible tab means attached adjacent to the end of the recording tape upon the back side thereof, wing means carried by said tab means projecting beyond each edge of said tape, and pressure sensitive adhesive means upon the hub side of said wing portions terminally flexed outwardly to wedge in adhesion with said flanges.

6. Tape securing tab means comprising a narrow body portion having a pressure sensitive adhesive on one face and wing portions extending laterally from said body portion at one end portion thereof having a pressure sensitive adhesive on the same face side.

7. The combination called for in claim 6 in which each wing means comprises a plurality of saw tooth shaped extensions.

8. In combination, a tape reel having a hub and flanges thereon spaced a predetermined distance, a length of magnetic tape wound on said reel between said flanges with the magnetic coated side of the tape disposed towards said hub, tab means located adjacent each end of the tape comprising an elongated body portion secured to the other side of said tape and wing portions on said body portion extending beyond the edges of said tape and normally defining an overall width greater than said predetermined distance, said wings having pressure sensitive adhesion on the faces thereof facing towards said hub, said wings at their tips being curled radially outwardly normal thereto with their extremities in pressure adhered contact with the side walls of said flanges.

9. The combination called for in claim 8 in which said wings comprise serrated saw tooth shaped elements pointed towards the respective ends of said tape.

10. The combination called for in claim 8 in which the tab means are spaced a distance from the respective ends approximately the radius of said reel.

11. The combination called for in claim 8 in which said tab and wing means constitute an integrated member of flexible woven material.

References Cited

UNITED STATES PATENTS

| | | | |
|---|---|---|---|
| 2,307,406 | 1/1943 | Howard | 154—2 |
| 2,541,476 | 2/1951 | Mihalyi | 242—74 X |
| 2,900,868 | 8/1959 | Gaffney | 242—74 X |
| 3,084,884 | 4/1963 | Panzer | 242—74 |

NATHAN L. MINTZ, Primary Examiner